April 29, 1947.  E. A. TIPPETTS  2,419,922
METHOD OF PRODUCING REINFORCING ELEMENTS
Filed July 2, 1943
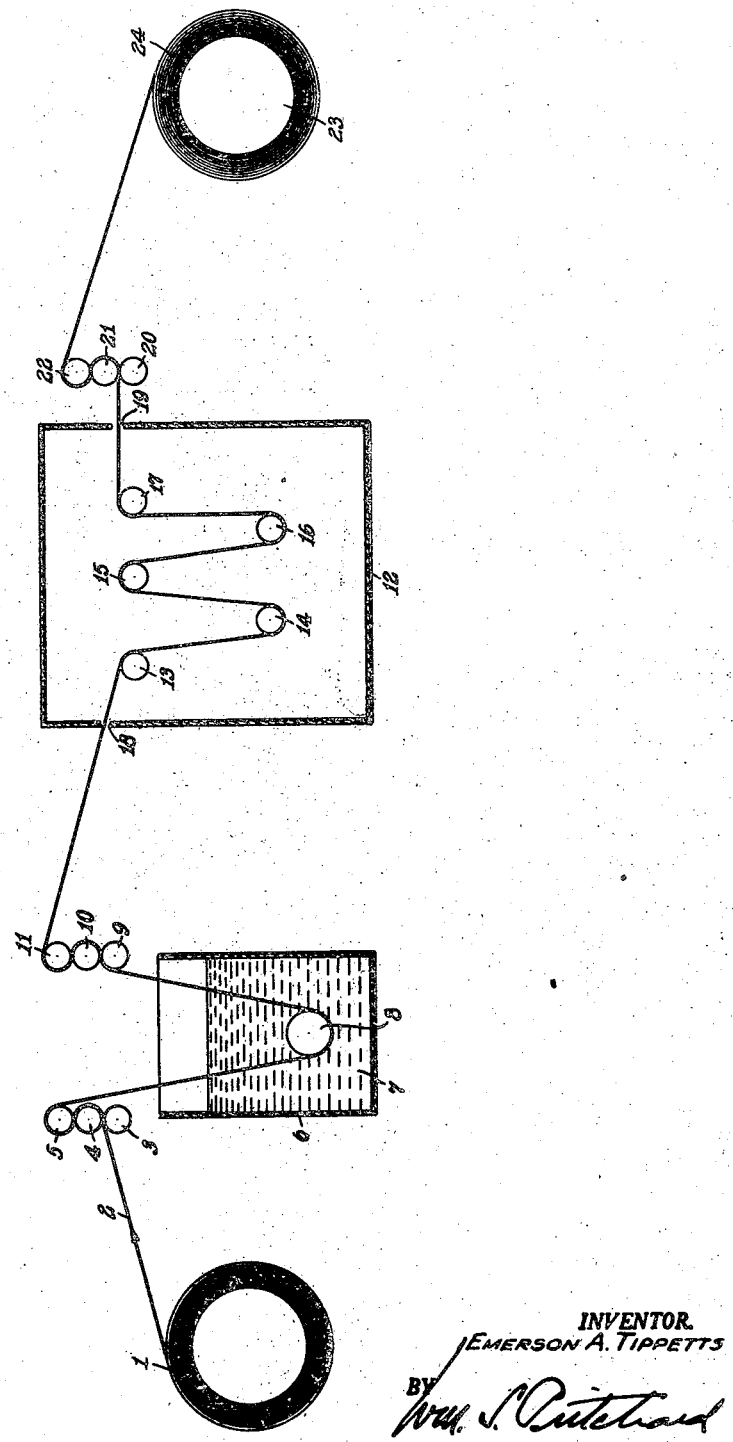
INVENTOR.
EMERSON A. TIPPETTS
BY
ATTORNEY.

UNITED STATES PATENT OFFICE 2,419,922

METHOD OF PRODUCING REINFORCING ELEMENTS

Emerson A. Tippetts, Richmond, Va., assignor to E. I. du Pont de Nemours & Company, Wilmington, Del., a corporation of Delaware Application July 2, 1943, Serial No. 493,228

2 Claims. (Cl. 154—91)

This invention relates to the treatment of reinforcing members to improve the adhesion thereof to rubber and the binding of such reinforcing members to rubber in the manufacture of rubber articles. More particularly, it relates to a process for applying an adhesive or bonding agent to a reinforcing member, such as cords, without substantially decreasing the tenacity of the cord and to produce a cord which, during or after incorporation in the manufacture of the rubber article, does not undergo any substantial loss in tenacity.

The invention is especially useful in connection with those cords that possess a low degree of twist and that have been prepared from continuous high-tenacity filament yarns. Such cords are disclosed in U. S. Patent 2,235,082 to Parker and U. S. Patents 2,188,174 and 2,235,867 to Castricum.

For convenience, the invention will be described with particular reference to the treatment of cord formed of regenerated cellulose for use in reinforcing rubber articles. However, it is to be understood that the invention is not so limited.

According to previously proposed processes for bonding regenerated cellulose reinforcing cords to rubber, the cord has first been thoroughly impregnated with an adhesive by treatment with a solution of the adhesive while under little or no tension, the impregnated cord then being dried, calendered and positioned in the rubber mass, the resulting article being then vulcanized or cured by the application of pressure and heat. The final structure obtained, however, has not been completely desirable because of the loss in strength suffered by the cord during the impregnation and curing operations. This loss, which in many cases amounted to as much as 15% to 20% of the original strength of the cord, has presented a serious problem, particularly to the manufacturers of the cord, for, although they have been able by various means to improve the original strength of the cord, much of this improvement has been lost during the subsequent adhesion, calendering, and curing steps.

It is an object of this invention to provide an improved process for applying an adhesive or bonding agent to a reinforcing member for rubber articles. Another object of this invention is to provide a process for applying an adhesive or bonding agent to a reinforcing cord for rubber articles without any substantial loss in strength of the cord. A further object of this invention is to provide a process for applying an adhesive or bonding agent to a cord-reinforcing member for rubber articles to produce a cord which, during and after incorporation thereof in rubber, does not undergo any substantial loss in strength. A still further object of this invention is to provide a cord coated with an adhesive or bonding agent to improve its adhesion to rubber, said cord having a tenacity substantially the same as that which it possessed prior to the application of the adhesive or bonding agent. A still further object of this invention is to provide a cord coated with an adhesive or bonding agent to improve its adhesion to rubber and which will undergo substantially no loss in strength during the adhesion and curing steps in the process of binding the cord to the rubber. Other objects will appear hereinafter.

The objects of this invention are accomplished, in general, by maintaining the cord under a definite range of tension (0.015 to 0.10 gram per denier of the cord) during the application of the adhesive or bonding agent and subsequent drying of the coated cord, whereby the application of the adhesive or bonding agent is substantially restricted to the surface of the cord, and excessive penetration into the inner structure (between the plies and filaments) is substantially prevented, placing the coated cord in contact with a rubber mass and vulcanizing or curing the assembly to produce the desired article.

Any suitable form of apparatus can be used in the practice of this invention provided that it is capable of maintaining the cord to be treated under the desired tension during the application of the adhesive and the drying of the treated cord.

In the accompanying drawing, there is shown diagrammatically one form of an apparatus for use with the invention.

Referring now to the drawing, wherein like reference numerals designate like parts, a plurality of reinforcing cords in the form of a cord fabric 2 are unwound from a supply roll 1 by coacting feed rolls 3, 4 and 5. The cords pass about the rolls 3, 4 and 5 without slippage and are led therefrom into a tank 6 containing the adhesive solution 7. The cords pass beneath a guide roll 8 submerged in the adhesive bath 7. The cords 2 are fed from the feed rolls 3, 4 and 5 through and out of the adhesive 7 by coacting feed rolls 9, 10 and 11, about which the cords also pass without slippage. The two sets of feed rolls 3, 4, 5 and 9, 10, 11 are positively driven and their peripheral speeds are so adjusted that the cord fabric passing between them and about the roll 8 is maintained under the desired range of tension. On leaving the second set of feed rolls 9, 10, 11, the coated cord fabric is led through a suitable opening into a drying chamber 12 which, in the form shown, is provided with guide rolls 13, 14, 15, 16 and 17, whereby the coated cord fabric is given a sinuous path of travel therethrough. The dryer is maintained at the desired temperature by the use of appropriate heating means (not shown). The path of travel of the coated cord fabric through the dryer 12 is such that, upon withdrawal therefrom, the adhesive will be at least in a set condition, i. e., will not penetrate further into the inner cord structure, and will permit winding of the coated cord fabric in a roll. The dried fabric is withdrawn from the drying chamber 12 through an opening 19 by means of co-acting positively driven feed rolls 20, 21 and 22, from which the dried cord fabric is collected on a suitable support 23 in the form of a roll 24. The peripheral speeds of the rolls 20, 21 and 22 and of the collection roll 23 are so adjusted as to prevent any substantial decrease in tension of the coated cord fabric during its passage from the rolls 9, 10 and 11 and through the chamber 12.

In order to more fully explain the invention, there is hereinafter described several embodiments of the process of the present invention:

Example I

An 1100–2 cord having a denier of 2450 is prepared in accordance with the disclosure of U. S. Patent 2,235,082 to Parker from two 1100 denier-480 filament yarns of regenerated cellulose, having a strength of about 3 grams per denier and twisted to 16.2 turns per inch, the yarns being combined to form a cord by twisting in the direction opposite to the thread twist, to 14.6 turns per inch. A plurality of these cords arranged in parallel manner in the form of a cord fabric are passed for a distance of 50 inches, while under a tension of 0.037 gram per denier, through an aqueous solution containing 2% by weight of resorcinol, 1.2% by weight of formaldehyde, 0.2% by weight of sodium hydroxide, and 10% by weight of rubber solids in the form of a natural rubber latex dispersion containng a suitable combination of vulcanizers, accelerators, stabilizers and the like. On leaving the bath, the cords are dried in a continuous manner and without permitting any decrease in their tension by passing about rollers mounted in a drying chamber maintained at a temperature of 140° C. The dried cords are then collected on a rotating bobbin. Tests show they suffer substantially no loss in tenacity as the result of this treatment. On the other hand, similar cords treated in the tensionless manner of the prior art suffer a 15% loss in tenacity. The dried cords of this example are then pressed into the rubber face (formed of commercial compounded uncured rubber stock) of canvas-backed pads, and the assembly subjected to pressure and elevated temperatures to secure the desired curing or vulcanization. The cords adhere to the rubber equally as well as does the cord treated in the tensionless manner of the prior art. When subsequently removed from the rubber and retested, the cords exhibit a strength substantially equal to their original value.

Example II

An 1100–2 cord having a denier of 2485 is prepared, in accordance with the teachings of U. S. Patent 2,235,867 to Castricum, from two 1100 denier-480 filament yarns of regenerated cellulose, having a strength of about 3 grams per denier and a twist of 15.1 turns per inch in the Z direction, the yarns being combined to form a cord by twisting to 10.9 turns per inch in the S direction. The cord possesses a breaking strength of 14.7 pounds, a breaking elongation of 13.4% and an elongation under 10 pound load of 8.5%. An adhesive solution is prepared in the following manner:

A solution prepared from 17 grams of resorcinol, 417 grams water, 36 grams of an aqueous 40% formaldehyde solution and 15 grams of an aqueous 10% sodium hydroxide solution is added to a mixture of 250 grams of rubber latex solution (60% solids, 0.5% ammonia), 250 grams water, and 15 grams of 10% aqueous sodium hydroxide. The final solution is aged at least 3 days before using.

The cord is passed at a speed of 180 inches per minute and under a tension of 48 grams (0.019 gram per denier) for a distance of 51 inches through the previously described adhesive.

On leaving this treating bath, the cord is dried in a continuous manner by passing through a drying chamber maintained at 140° C., the tension on the cord building up to a value of 150 grams (0.060 gram per denier) while passing through the chamber. The dried cord is then pressed into a rubber face (comprising about 0.05 inch of uncured, compounded rubber) of canvas-backed pads, and the resulting structure cured or vulcanized by subjecting it for a period of one hour to a temperature of 135° C. and a pressure of 1200 pounds per square inch. When subsequently removed from the structure and tested, the cord exhibits a breaking strength of 14.6 pounds, a loss of only 0.7% of the strength of the original cord. In contrast to this, a sample of the original cord, when treated with the adhesive solution of this example in the tensionless manner of the prior art, and pressed into the rubber face of a canvas-backed pad and cured as above, exhibits a breaking strength of only 12.7 pounds, a loss of 13.6% of the strength of the original cord.

Example III

Four strands of a high tenacity regenerated cellulose yarn having a denier of 275 and a filament count of 120 and a twist of 4 turns per inch in the Z direction are twisted together to 18.8 turns per inch in the S direction, two of the resulting plies then being twisted together to 11.7 turns per inch in the Z direction to form a cord having a total denier of 2500. The cord possesses a breaking strength of 14.0 pounds, a breaking elongation of 14.2% and an elongation under 10 pound load of 9.9%.

The cord is treated in the manner of Example II with the adhesive of that example, the cord being maintained under a tension of 45 grams (0.018 gram per denier) during its passage through the adhesive solution and under a tension of 135 grams (0.054 gram per denier) during its passage through the drying chamber. The treated cord possesses a breaking strength of 13.5 pounds (a loss of only 3.5%, a breaking elongation of 13.9% and an elongation under 10 pound load of 9.2%).

A second portion of the original cord, when treated with the same adhesive in the tensionless manner of the prior art, possesses a breaking strength of 12.6 pounds (a loss of 10%), a breaking elongation of 17.1% and an elongation under 10 pound load of 12.9%.

A third portion of the original cord, when treated with the adhesive under a tension of 300 grams (0.12 gram per denier) and dried at a tension of 500 grams (0.20 gram per denier), shows a slight gain in tenacity (0.7%) but very marked and undesirable losses in breaking and 10 pound load elongations.

Of these three samples of cord, the first, treated in accordance with the principles of this invention, is the most highly suited for use in the reinforcing of rubber articles.

In accordance with this invention, cords for use in the reinforcing of rubber articles, such as tires, are maintained under a definite range of tension during the treatment of the cord with an adhesive and the subsequent drying operation, this tension being applied to the cord from the start of the adhesive treatment and being continued during the drying operation at least until the adhesive coating has become "set," i. e., rendered immobile so that it cannot penetrate further into the inner structure (between the plies and filaments) of the cord structure on the yarn. Satisfactory results are obtained when the tension is within the range of from 0.015 to 0.1 gram per denier of the cord. For optimum results, the tension should be within the range of 0.035 to 0.07 gram per denier of the cord. As shown in the above examples, if the tension applied to the cord is below 0.015 gram per denier, the cord suffers an undesirable loss in strength. On the other hand, if the tension exceeds 0.1 gram per denier, the cord undergoes an appreciable and undesirable loss in elongation. It is generally preferred that the tension applied to the cord be maintained at a constant value during both the adhesive treatment and drying operations. However, this is not essential and, if desired, the treated cord can be dried at a somewhat higher tension, provided, of course, that the tension does not exceed the range proposed by this invention.

The application of the tension in accordance with this invention substantially restricts the application of the adhesive or bonding agent to the surface of the cord and does not permit excessive penetration thereof into the inner structure of the cord (between the plies and filaments). When cords are treated in a tensionless state, a substantial amount of penetration of the adhesive into the inner structure of the cord occurs and the individual plies and filaments of the cord become distorted and bound together. Such distortion and binding prevents a relative movement between the plies and filaments, whereby subsequent even distribution between the stress of the elements of the cord is prevented and the strength of the cord is reduced. The tensioning of the cord in accordance with this invention prevents distortion of its elements and compacts the cord so that the adhesive solution has little chance to gain access to the interior of the cord. Any small amount of adhesive that may penetrate the cord is more uniformly distributed therein, whereby substantially even distribution of the stress between the elements of the cord is obtained.

The application of the tension provided by the invention does not generally cause any substantial degree of stretching. However, stretching of the cord can take place if desired, and in certain instances, for example, in the case of regenerated cellulose cords that have not been stretched during their manufacture or that have been prepared from yarns of high elongation, or in the case of cords prepared from nylon or other synthetic polymers, it is found that a stretching of the cord at this time, of, for example, 5% of its length, greatly reduces the tendency of the cord to "grow" or become permanently elongated during subsequent use.

The above examples illustrate the use of this invention with cords of known construction and possessing a low degree of twist. The invention is particularly useful in connection with such cords, because of their tendency to undergo a marked loss in strength when treated with an adhesive in the tensionless manner of the prior art. However, the invention is not limited to use with such cords, and is in fact useful in the treatment of cords of any given construction. Thus, the use of the invention with so-called "high twist" cords not only reduces the loss in strength suffered by such cords when treated with an adhesive in the manner of the prior art, but also materially decreases the undesirable tendency of such cords to "grow" during subsequent use.

Moreover, it is to be understood that while the present invention has been described in terms of a cord prepared from continuous filaments of regenerated cellulose having a dry tensile strength of 2 grams or more per denier, and preferably 2.5 grams or more per denier, the invention is not so limited. It is also applicable to the treatment of cords prepared from cotton or from synthetic filament-forming materials, such as ethyl cellulose, synthetic linear polyamides, etc., which are to be bonded to rubber. The cords may further be prepared from yarns comprising either continuous filaments or staple fibers.

In a similar manner, the term "rubber" as used throughout the specification and claims is intended to be used in its generic sense to include rubber substitutes, natural rubber, compounded rubber, modified rubber, synthetic rubber and the like. Moreover, cords treated in accordance with the present invention may be vulcanized to these various rubbers by the use of any of the known curing or vulcanizing processes involving the use or not of any suitable combination of vulcanizers, accelerators, stabilizers, etc.

In most cases, the application of this tension requires that the cord be maintained under a stretching tension during the adhesive treatment and drying operation. However, this is not always necessary and, in certain cases, for example, in the case of cords that possess a high wet shrinkage, the proper application of tension can be achieved by merely maintaining the cords at constant length, or, in the case of cords having a still higher wet shrinkage, by permitting them to shrink a controlled amount during treatment. This is because of the tendency of such cords to shrink and develop tension when wetted by the adhesive. Of course, if the cord has previously been treated with a water-repellent finish, such as a solution of triethanolamine stearate, isopropanol amine stearate, or triethanolamine stearate together with an excess of stearic acid, still other specific treating conditions may have to be developed to permit the cord to be maintained under the desired tension of this invention during the adhesive treatment and drying operations. These specific conditions are, of course, all considered to be within the scope of this invention, the proper conditions for use with any given cord being readily determined by experiment. For example, when the cord has been treated with such a water-repellent finish (cords treated with a finish comprising a solution of triethanolamine stearate together with an excess of stearic acid are approximately 40 times more water-repellent than similar cords treated with a conventional sulfonated vegetable oil-mineral oil finish), the tension employed is preferably chosen from the lower ends of the range of this invention.

In addition to the specific nature and construction of the cord, the operational details of this invention are also somewhat affected by the nature and temperature of the adhesive solution employed and the time the cord is in contact with the solution. For example, when the adhesive solution employed is relatively viscous or contains particles of large size, somewhat lower tensions or longer treating periods can be used than when the solution is less viscous or contains particles of smaller size. The specific adhesive solutions mentioned above are, of course, admirably suited for use with the invention. However, the invention is not limited to their use and any of the known adhesives for use in bonding cords to rubber can be used in the process of this invention for the production of reinforced rubber articles of greatly improved properties.

While this invention has been discussed primarily from the standpoint of maintaining the cords under a definite, controlled range of tension during the adhesive treatment and drying steps, somewhat further improvements in the nature of the final cord can also be obtained by maintaining these treated cords under a similar tension during the subsequent calendering and vulcanizing or curing steps employed in the subsequent formation of the final rubber article. The use of such a tension during these steps is also contemplated by the invention.

The application of tension contemplated by this invention may be obtained in any suitable manner and, while the apparatus of the accompanying drawing operates in a very satisfactory manner, it is obvious that other types of apparatus can also be used and are within the scope of this invention.

The invention is not restricted to any particular rubber articles and is capable of use in any rubber articles in which reinforcements are necessary or desirable, such as automobile tires, belts, steam hose, and the like.

This present invention makes possible the manufacture of reinforced rubber articles that possess improved physical properties by virtue of the fact that the reinforcing members employed retain substantially all of their original strength. Cords prepared in accordance with the principles of this invention are particularly useful in the manufacture of such rubber articles as tires wherein the strength and elongation of the cords are particularly important. Because cords treated in the manner of this invention retain substantially all of their original strength, the invention makes possible the production of stronger, more durable tires than has hitherto been possible. The invention also makes possible the production of tires having a strength and durability substantially equal to those of the prior art, without, however, requiring as great a number of reinforcing cords to impart that desired strength.

The process of the present invention may be readily and economically incorporated in existing apparatus for the application of adhesives to cord. Moreover, because the adhesive applied is restricted to the surface of the cord, less adhesive is used to obtain essentially the same degree of adhesion of the cord to the rubber structure, thereby reducing the cost of the operation.

Since it is obvious that many changes and modifications can be made in the above-described details without departing from the nature and spirit of the invention, it is to be understood that the invention is not to be limited thereto except as set forth in the appended claims.

I claim:

1. A method of making cords for use as reinforcements in rubber articles which comprise applying an adhesive to a cord maintained under a tension of 0.015 to 0.1 gram per denier of the cord, said cord possessing a low degree of twist and formed of continuous filaments of regenerated cellulose having a dry tensile strength of at least 2 grams per denier, and drying the treated cord under a tension not less than that in the cord when the adhesive was applied and not greater than 0.1 gram per denier of the cord.

2. A method of making cords for use as reinforcements in rubber articles which comprises applying an adhesive to a cord maintained under a tension of 0.035 to 0.07 gram per denier of the cord, said cord possessing a low degree of twist and formed of continuous filaments of regenerated cellulose having a dry tensile strength of at least 2 grams per denier, and drying the treated cord under a tension not less than that in the cord when the adhesive was applied and not greater than 0.07 gram per denier of the cord.

EMERSON A. TIPPETTS.

REFERENCES CITED

The following references are of record in the file of this patent:

UNITED STATES PATENTS

| Number | Name | Date |
| --- | --- | --- |
| 1,729,272 | King | Sept. 24, 1929 |
| 2,220,958 | Jennings | Nov. 12, 1940 |
| 2,098,038 | Hazell | Nov. 2, 1937 |
| 2,129,626 | Riehl | Sept. 6, 1938 |
| 2,188,283 | Manchester | Jan. 23, 1940 |
| 1,747,533 | Sessions | Feb. 18, 1930 |